United States Patent [19]
Goodhart

[11] 3,952,587
[45] Apr. 27, 1976

[54] VEHICLE TORQUE SENSING DEVICE

[76] Inventor: Richard Goodhart, 528 Atlanta Ave., Massapequa, N.Y. 11758

[22] Filed: Sept. 24, 1974

[21] Appl. No.: 508,820

[52] U.S. Cl. .............................. 73/136 R; 73/118; 338/47
[51] Int. Cl.[2] ............................................. G01L 5/13
[58] Field of Search ........... 73/136 R, 140, 141 AB, 73/146, 118; 338/47; 340/52 R

[56] References Cited
UNITED STATES PATENTS

| | | |
|---|---|---|
| 2,426,089 | 8/1947 | Fitzgerald, Jr. ............... 73/136 R X |
| 2,946,219 | 7/1960 | Kemper .......................... 73/136 R |
| 3,009,132 | 11/1961 | Steigerwald ..................... 340/52 R |
| 3,668,629 | 6/1972 | Pawl .............................. 340/53 |
| 3,805,599 | 4/1974 | Illman et al. ................. 73/141 AB X |

*Primary Examiner*—Charles A. Ruehl

[57] ABSTRACT

The invention is a device for sensing torque differential developed by the driven wheel of a vehicle and an indicator to indicate relative degrees of the developed torque.

5 Claims, 5 Drawing Figures

VEHICLE TORQUE SENSING DEVICE

This inventory relates generally to a system that will indicate the relative skid-effect of a vehicle's driven wheel and more particularly a novel torque sensor and circuit controlled indicator that positively or negatively indicates the limits of linear vehicle movement during braking and/or powered acceleration.

The present invention includes a novel torque sensor that is adapted to respond to relative pressures between the body or frame of a vehicle and the axle having the driven wheel. The pressure differential is electronically inserted in a circuit that controls a visual indicator conveniently mounted in the vehicle to indicate to the driver the degree of pressure differential and accordingly the relative danger of a potential skid.

Thus, one of the princicpal objects of the invention resides in the provision of an indicating system that can measure and indicate to the driver of a vehicle a potential skidding condition.

Another object of the invention is to provide in a system of the character described manual means to adjust the indicating means to balance under normal driving conditions.

Yet another object is to provide an inexpensive torque sensor that can be adapted to be mounted on most vehicles to cooperate with the system indicator.

Still another object is to provide adjustable means in the indicator whereby each vehicle driver may adjust the indicator to define the skid potential limits of the individual vehicle prior to the vehicle physicaly skidding and deviating from linear movement.

Other ancillary objects will be in part hereinafter pointed out and will be in part hereinafter apparent.

Figure 1:
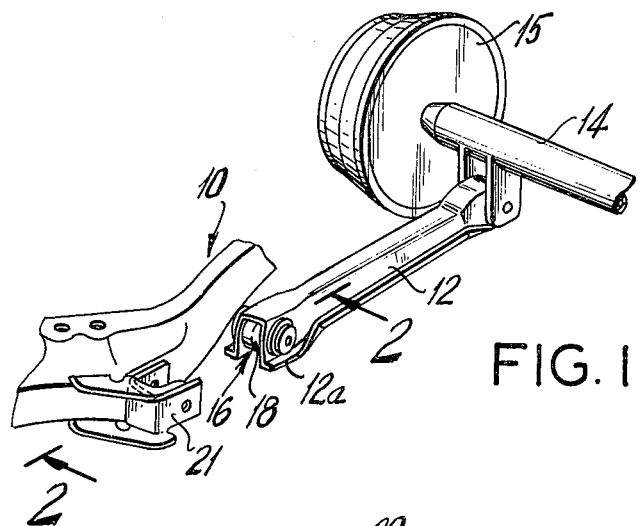
FIG. 1 is an isometric view, shown in exploded relation, of a typical rear axle vehicle body mount with a rubber bushing disposed between the rear axle arm and the body frame.
Figure 2:
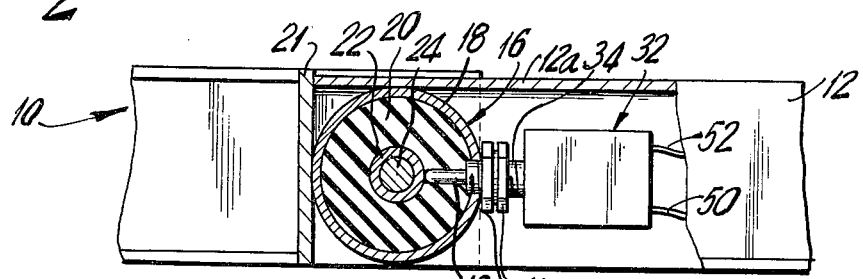
FIG. 2 is a cross-section taken along line 2—2 of FIG. 1 with the elements in normal assembled relation.
Figure 3:
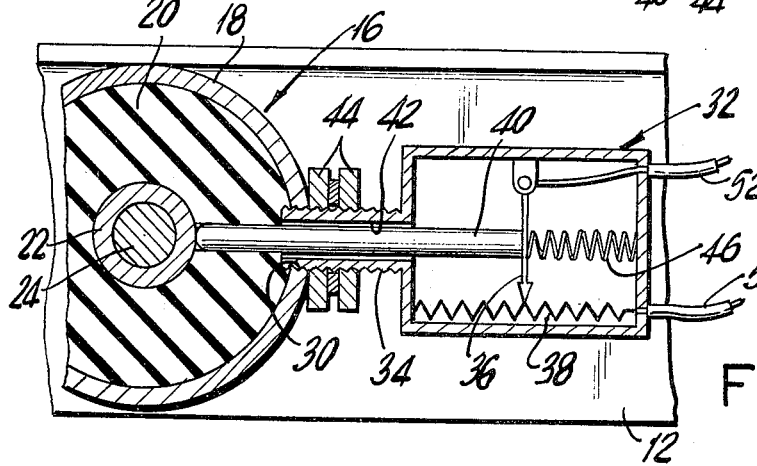
FIG. 3 is an enlargedd cut-away cross-section of the novel torque sensor and bushing.

Referring to the drawing in detail, 10 generally designates the main frame of a vehicle to which the rear arm 12 is secured. Axle 14 is secured to the arm 12 in a conventional manner. While not shown, it will be understood that there is provided a pair of arms 12 to balance the main frame 10 on the axle 14. However, the arm 12, as shown, is the arm closest to the driven wheel 15.

The forward terminal portion of arm 12, identified as portion 12a, surrounds a bushing 16 that comprises a steel outer shell 18, a rubber insert 20, bonded to the inner periphery of shell 18 and a central steel core 22, also bonded to the inner periphery of rubber insert 20. A through bolt 24 secures the bushing 16 to a U-shaped member 21 secured to the frame 10. Bolt 24 passes through core 22. Conventional means secures the other terminal portion of arm 12 thereon to the axle 14 in pivotal relation. It will be understood bolt 24 secures the central steel core 22 in fixed relation with the main frame 10 while the arm 12 is secured to the outer shell 18 of bushing 16.

To prepare the bushing 16 and arm 12 for the present invention, a hole 30 is drilled through shell 18 of bushing 16 and rubber insert 20 to expose the inner core 22. The hole 30 in shell 18 is threaded to facilitate mounting of the sensor unit 32, as hereinafter described.

As hereinbefore set forth, sensor 32 is mounted on the bushing 16 of arm 12 adjacent to the driven wheel 15. It is well known in the automotive art that it is customary for a vehicle to have one of the wheels connected to the power train and the remaining wheels substantially idler wheels. On this basis, the present invention is secured to the bushing 16 of the arm 12 adjacent to the driven wheel.

Sensor 32 comprises a housing 34 having a pivotal arm 36 insulated from housing 34 and engaging a linear resistance 38. An electrically insulated plunger 40 abuts against pivotal arm 36 and extends through housing 34 to project beyond aperture 42 in housing 34. Housing 34 is threaded to match the threaded hole 30 in shell 18 of bushing 16. When threadedly mounted in bushing 16, sensor 32 is so disposed to position plunger 40 in engagement with steel core 22 surrounding the bolt 24. Lock nuts 44 secure sensor unit 32 in this adjustable relationship.

Pivotal arm 36 is spring urged by compression spring 46 against plunger 40 to positon arm 36 in a pre-settable portion of resistance 38 for a purpose hereinafter appearing.

Sensor unit 32 has extending therefrom a pair of conductors 50–52. Conductor 50 is secured to the resistance unit 38 and conductor 52 is connected to the pivotal arm 36 that wipes the resistance unit 38. Thus, connectors 50, 52 are in series with the resistance unit 38 that is variable in accordance with pressure changes on plunger 40.

Figure 4:
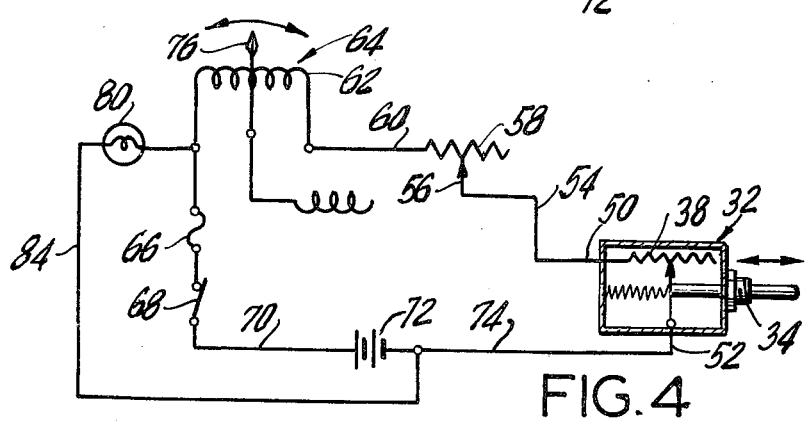
FIG. 4 is a schematic diagram of the circuit incorporating the veicle's skid-condition sensor-indicator.
Figure 5:
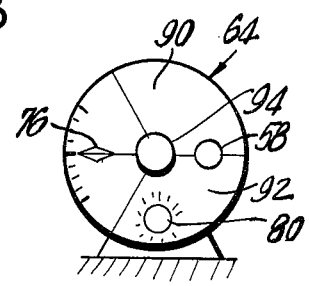
FIG. 5 is a front elevation of the visual skid-condition indicator.

Referring to FIG. 4, there is shown a schematic circuit diagram wherein conductor 50 is connected by a conductor 54 to the arm 56 of potentiometer 58. One terminal of potentiometer 58 is connected by conductor 60 to one terminal of coil 62 of a milliammeter 64. The other terminal of coil 62 is connected to a fuse 66 that is in turn connected in series with a switch 68 and a conductor 70 to the positive terminal of a battery 72. The negative terminal of battery 72 is connected by a conductor 74 to conductor 52 of sensor unit 32.

With switch 68 operated to closed relation, potentiometer 58 is adjusted to zeroize meter 64. Indicating needle 76 of meter 64 varies in accordance with the changing pressure sensed by the unit 32. One terminal of a pilot lamp 80 is connected to the fused side of fuse 66 and the other terminal of lamp 80 is connected by conductor 84 to the negative terminal of battery 72.

Thus, with switch 68 closed and the veicle not moving, potentiometer 58 is utilized to zero needle 76. Positive or negative pressure changes on plunger 40 of sensor unit 32, caused by acceleration or braking of the vehicle, will correspondingly cause needle 76 to move right or left of zero position relative to the degree of pressure change between plunger 40 and core 22. The degree of pressure change affects the respective needle 76 to indicate to the vehicle driver the potential skid condition and alerts the driver to control the vehicle to avoid the danger.

While simple circuits have been utilized to illustrate the operation of the indicator, it will be understood that different color translucent overlays could be used. In this embodment, colored overlays 90–92 could be rotated manually by a central knob 94 and back-lighted by the energized lamp 80 in contrast with the safe zone of needle 76.

The invention relates to a variable resistance that is in series with a power supply and a meter. The sensor or variable resistance is controlled by the pressure of the driven axle on the yieldable bushing that mounts the axle to the vehicle frame. Obvious changes in pressure causes changes in resistance that changes the meter reading. A potentiometer in series with the meter permits the vehicle operator to zeroize the meter, in this instance at a central or midpoint indication.

Thus, the newness, wear, size, or other external tire conditions have no effect whatsoever in as much as the meter is zeroed for existing conditions. Further, it is well known that a skidding wheel does not move the vehicle but merely spins whereby pressure between the axle mounting bushing and the frame relaxes. This drop in pressure will reflect on the meter indication as a resistance change occurs.

It will be apparent that a steady increase in pressure when the vehicle increasingly accelerates will appear on the meter as a (meter) pointer or needle movement in one direction. When a skid occurs, the pressure drops and the needle similarly returns toward the zero position.

Knowledge of this point, i.e., the point where the skid or spinning occurs on the meter, then alerts the driver to be cautious when he observes the needle approaching the skid occurring position on the meter. Easing of the gas pedal will prevent the unwanted condition.

While a single embodiment of the invention has been shown and described, it will be understood that changes and modifications could be made thereto without departing from the scope of the invention, as set forth in the following claims.

The invention claimed is:

1. A device for determining potential skid conditions of a moving vehicle, comprising in combination,
  a. a resilient bushing yieldably connecting the driven axle of the vehicle to the vehicle frame, said bushing having a rubber insert and a steel outer shell; sensing means responsive to distortions of said rubber insert effected by pressure changes between said axle and said frame, said sensing means including a housing fixed relative to said outer shell and a relatively movable member; and
  b. indicating means connected to said sensing means to visually indicate the relative pressure changes during acceleration or deceleration of the vehicle.

2. In a device as set forth in claim 1,
  a. and said sensing means including a variable resistance element fixed relative to said housing and a movable wiper driven by said movable member in variable contact therewith,
  b. and said wiper being alternately movable in opposite directions on said resistance element to vary the resistance with the pressure changes resulting from acceleration or deceleration.

3. In the device as set forth in claim 2,
  a. said indicating means comprising a resistance measuring meter included in a direct current circuit with the sensing means, and
  b. a manually variable resistance element included in the direct current circuit, manually variable to zeroize the meter relative to the position of the sensing means.

4. In a device as set forth in claim 3,
  a. and means to adjust the sensing means in a sensing means mounting means to position and secure the sensing means in pressure change responding relation with the vehicle frame and driven axle.

5. In a device as set forth in claim 4,
  a. and said indicating means including a resistance measuring meter having internal illumination means to illuminate the meter needle and indicia representative of degrees of the sensing means pressure changes,
  b. and a circuit switch to energize said illumination means and concurrently energize the direct current circuit connecting the sensing means to the indicating means.

* * * * *